(12) United States Patent
Wong

(10) Patent No.: US 7,708,883 B2
(45) Date of Patent: May 4, 2010

(54) BOX FILTER STRUCTURE

(76) Inventor: Tommy Chi-Kin Wong, Unit 16-18, 5/F, Pacific Trade Centre, 2 Kai Hing Rd., Kowloon Bay (HK)

(\*) Notice: Subject to any disclaimer, the term of this patent is extended or adjusted under 35 U.S.C. 154(b) by 600 days.

(21) Appl. No.: 11/583,705

(22) Filed: Oct. 20, 2006

(65) Prior Publication Data

US 2007/0262012 A1 Nov. 15, 2007

(30) Foreign Application Priority Data

May 11, 2006 (CN) .................. 2006 1 0060648

(51) Int. Cl.
*B01D 24/06* (2006.01)

(52) U.S. Cl. .............. 210/266; 210/282; 210/283; 210/284; 210/291; 210/316; 210/317; 210/456; 210/502.1; 210/167.25

(58) Field of Classification Search ............ 210/167.25, 210/167.27, 263, 265, 266, 282, 283, 284, 210/291, 299, 310, 317, 456, 484, 485, 502.1, 210/316

See application file for complete search history.

(56) References Cited

U.S. PATENT DOCUMENTS

| 3,513,978 A | \* | 5/1970 | Newsteder | 210/167.25 |
| 7,425,274 B1 | \* | 9/2008 | Helfet | 210/807 |
| 2004/0238426 A9 | \* | 12/2004 | Fox et al. | 210/169 |

\* cited by examiner

*Primary Examiner*—Matthew O Savage
(74) *Attorney, Agent, or Firm*—Rabin & Berdo, P.C.

(57) ABSTRACT

A box filter comprises of a casing and at least two filters, which are installed inside the casing and behind the influx channel and have a buffer gap between two adjacent filters; the influx channel, which is installed on the external wall of the box filter. In addition, more than one guide vane is installed at the inlet of the influx channel and the bottom of the guide vane leans against the filter so as to eliminate the clog that forms the channel and so as to stop backflow of the sewage into the aquarium or container of the sift device while the box filter or sift device is removed from the aquarium. The guide vane can effectively improve drawbacks of the box filter of a prior art as well as enhance the filtration effect.

7 Claims, 6 Drawing Sheets

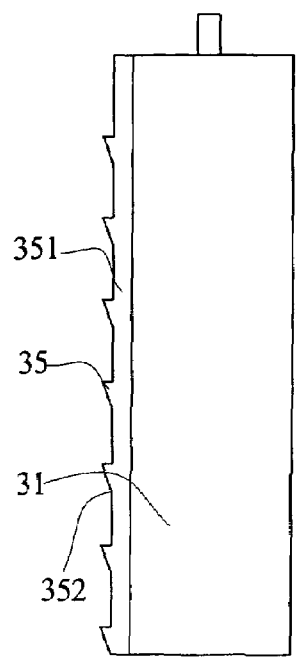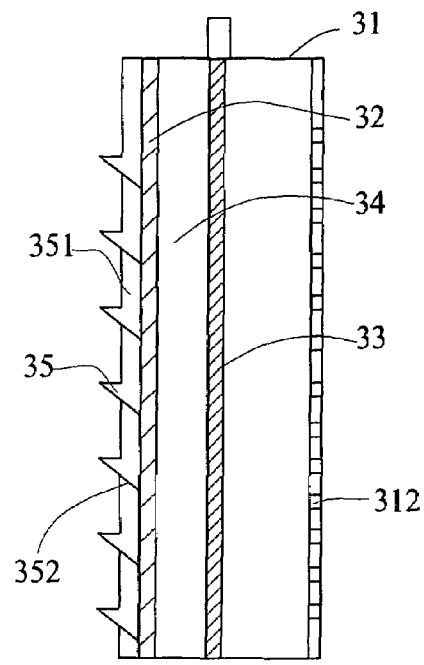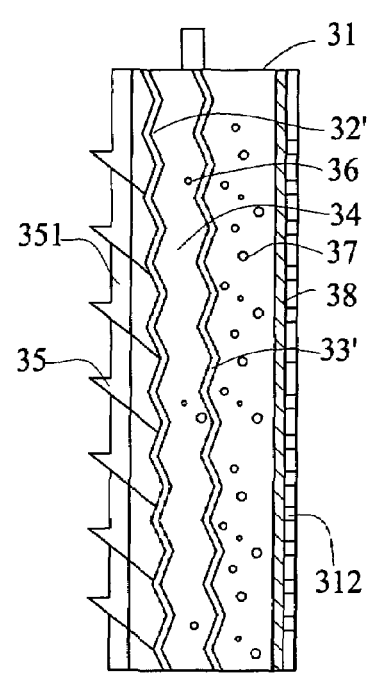
Fig.5     Fig.6     Fig.7
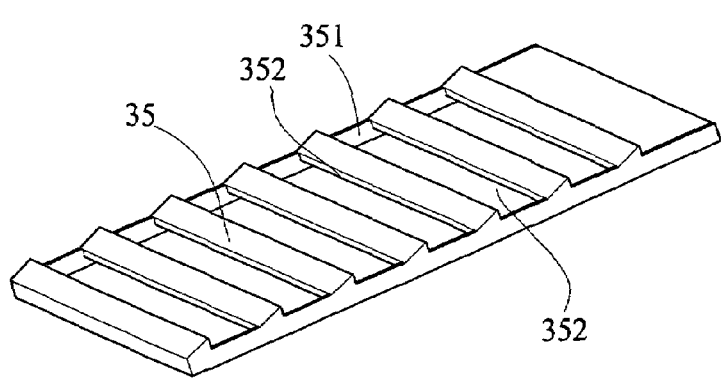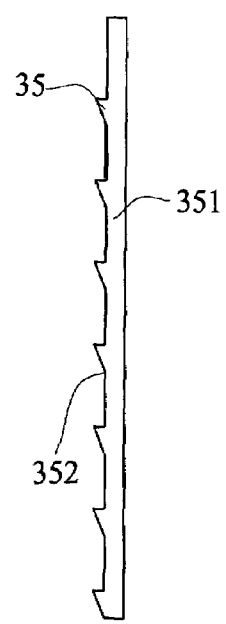
Fig.8     Fig.9

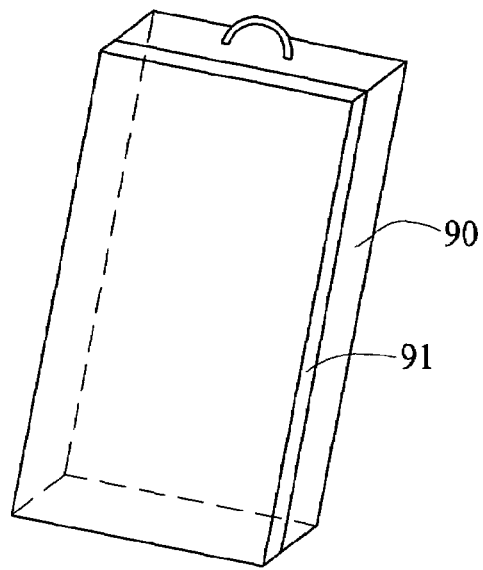
Fig.13 PRIOR ART
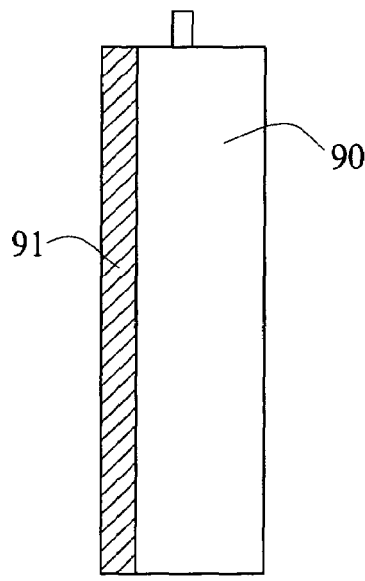 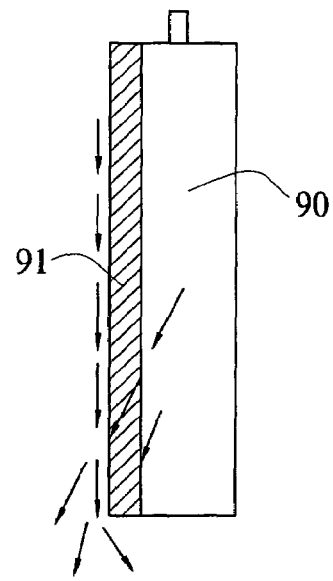
Fig.14 PRIOR ART          Fig.15 PRIOR ART

BOX FILTER STRUCTURE

BACKGROUND OF THE INVENTION

I. Field of the Invention

The present invention refers to a box filter, particularly a box filter that utilizes filters to clean water in an aquarium.

II. Description of the Prior Art

As living standards of human life have drastically ameliorated, home and public décor has gained more and more attention and aquariums have become an important component of décor. As shown in FIGS. 13~15, the structure of the box filters or sift devices of a prior art is usually a container 90 that holds a mono-laminated filter floss 91, which is very thick so as to achieve effective filtration. Nevertheless, meshes of the thick filter floss 91 are so fine that they are easily clogged and form channels, which consequently cause backflows of dirt into the aquarium or container of the sift device while the box filter 90 or sift device is removed from the aquarium, as indicated by the arrows in FIG. 15.

Therefore, supply of a box filter that solves the foregoing drawbacks has become a technical issue to be overcome.

SUMMARY OF THE INVENTION

Objective of the present invention is to provide a box filter that solves the channel problem caused by the mono-laminated filter floss of a prior art, maximizes the filtration effect, guides the sewage into the box filter as well as stops backflows of the sewage into the aquarium or container of the sift device while the box filter or sift device is removed from the aquarium.

Objective of the present invention is attained through providing a box filter comprising of a casing, which has an influx channel, and at least two filters inside the casing. The filters are located behind the influx channel and have the buffer gap between the two adjacent filters.

Objective of the present invention is also attained through providing a box filter comprising of a casing, which has an influx channel, and a filter, which is installed for filtration in the casing and behind the influx channel. More than one guide vane is installed at the inlet of the influx channel and the bottom of each guide vane leans against the filter.

The foregoing filter box comprises of guide vanes that are installed at the inlet of the influx channel and the bottom of each guide vane tilts towards the filter.

The forgoing guide vanes are fins that tilt inwardly, and the bottom of each guide vane leans against the filter.

The foregoing box filter comprises of at least two filters, which are lapped one over the other with a buffer gap.

The filter becomes finer and denser by approaching the afflux channel from the influx channel.

The foregoing filter is of a corrugated or wave type.

The grainy substance for filtration is installed between the two adjacent filters.

The grainy substance for filtration is also installed between the filter beside the influx channel and the casing.

The foregoing grainy substance is an absorbing or ion exchange filter.

The foregoing box filter comprises of two or more filtration units which have their respective influx and afflux channels. The filtration units are by hemisphere or angularity and can be assembled into one hollow column or cubic.

Compared to the technology of a prior art, the technology that the present invention adopts allows the box filter to have a practical structure that provides grade filtration through a larger filtration surface of the multi-filters. In addition, the buffer gap between the two filters can utilize the water pressure to eliminate clog and channel formation that help the filters to process precision grade filtration and whose effect is beyond what the mono-laminated filter floss can achieve. Furthermore, installation of the guide vanes effectively stops backflow of sewage into the aquarium or container of the sift device while the box filter is removed from the aquarium regardless of whether the multi or mono-laminated filters are installed.

BRIEF DESCRIPTION OF THE DRAWINGS

FIG. 5 is the cross sectional view of the box filter of FIG. 4.

FIG. 6 is the perspective view of the box filter of FIG. 4.

FIG. 7 is the cross sectional view of an upgrade box filter based on the box filter of FIG. 6.

FIG. 8 is the three-dimensional view of the guide vane of FIG. 4.

FIG. 9 is the cross sectional view of the guide vane of FIG. 8.

FIG. 13 is the sectional view of the box filter of a prior art.

FIG. 14 is the perspective view of the box filter of FIG. 13.

FIG. 15 shows the sewage flow direction while the box filter of FIG. 14 is removed from the water.

DESCRIPTION OF THE PREFERRED EMBODIMENT

Further structures, installations, and desirable features of the present invention will be better understood from the detailed description and drawings that follow in which various embodiments of the disclosed invention are illustrated by way of example.

Figure 1:
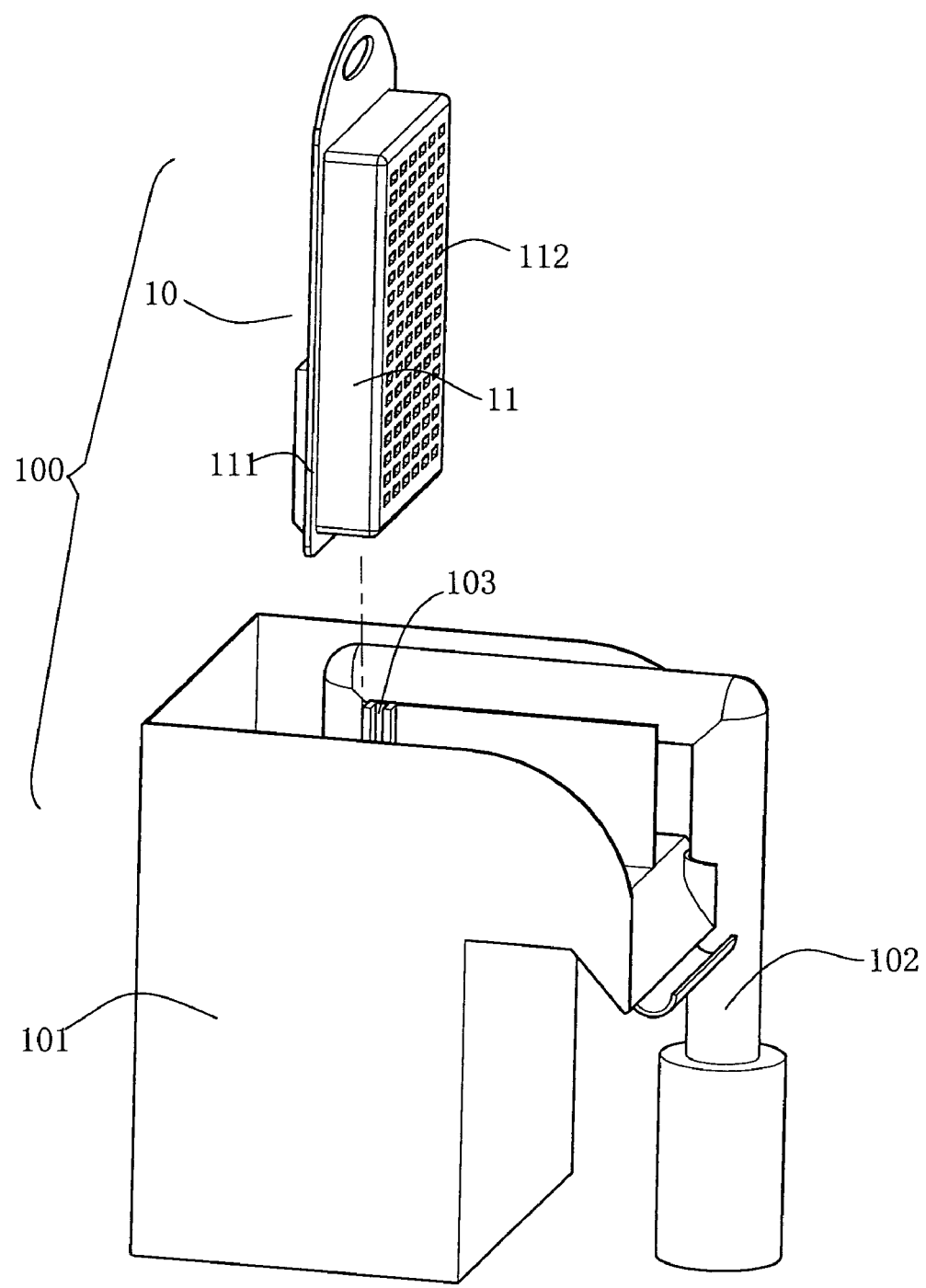
FIG. 1 is the three-dimensional view of a sift device that accommodates the box filter of the invention.
Figure 2:
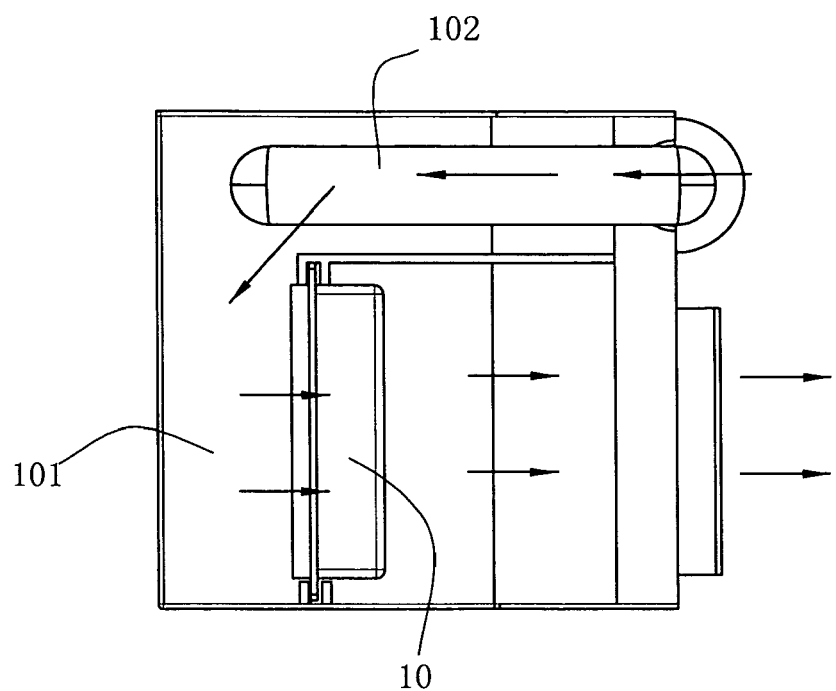
FIG. 2 is the bird's-eye view of the sift device of FIG. 1.
Figure 3:
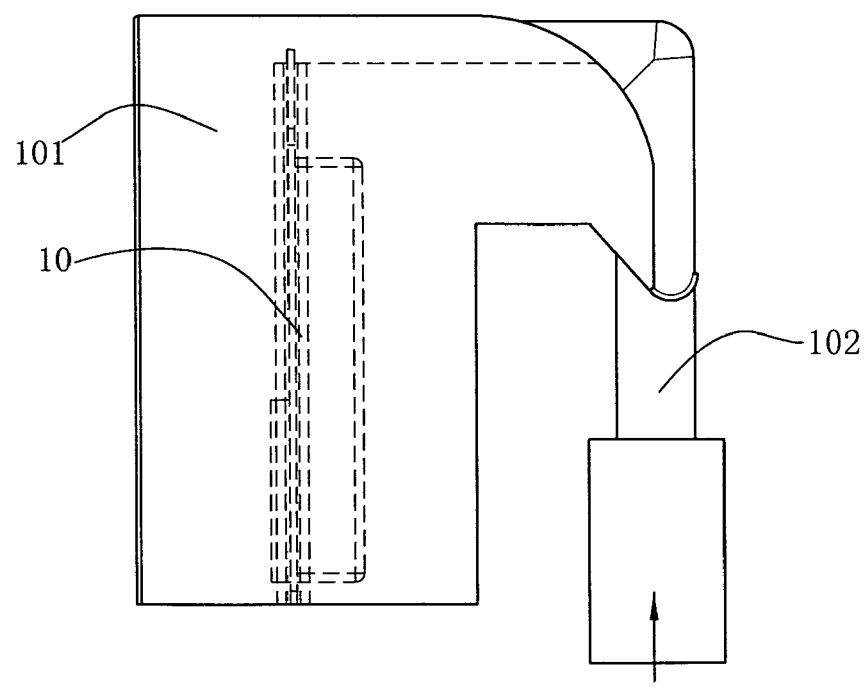
FIG. 3 is the cross sectional view of the sift device of FIG. 1.

With reference to FIGS. 1 to 3, the box filter 10 of the present invention is mainly installed in a sift device 100 or aquarium. The following embodiment is to install the box filter in a sift device 100. The sift device 100 comprises of a casing 101 which accommodates a container, a conduit 102 connected to an external water source such as water in the aquarium, and a box filter 10 which is installed at outlet of the said container so that the water can be filtrated while being drained. In this embodiment, the box filter 10 comprises of a casing 11 that can be stationed on the casing 101 by wedging its tenons 111 on the flanks into the mortises 103 at two sides of the container outlet. However, the stationary may be of other types as the structure of box filter may vary. On the front and rear walls of the box filter 10, there are influx channels that conduct the sewage for filtration and afflux channels that drain the filtrated water. Specifically, the influx channel is located on front wall of casing 11 of the box filter 10 to receive sewage from the container; the afflux channels 112, which are arrayed in matrix, are located on rear wall of casing 11 of the box filter 10 to drain the filtrated water. It is the filters installed inside the box filter 10 that achieves the recycling filtration, which is detailed as follows.

Figure 4:
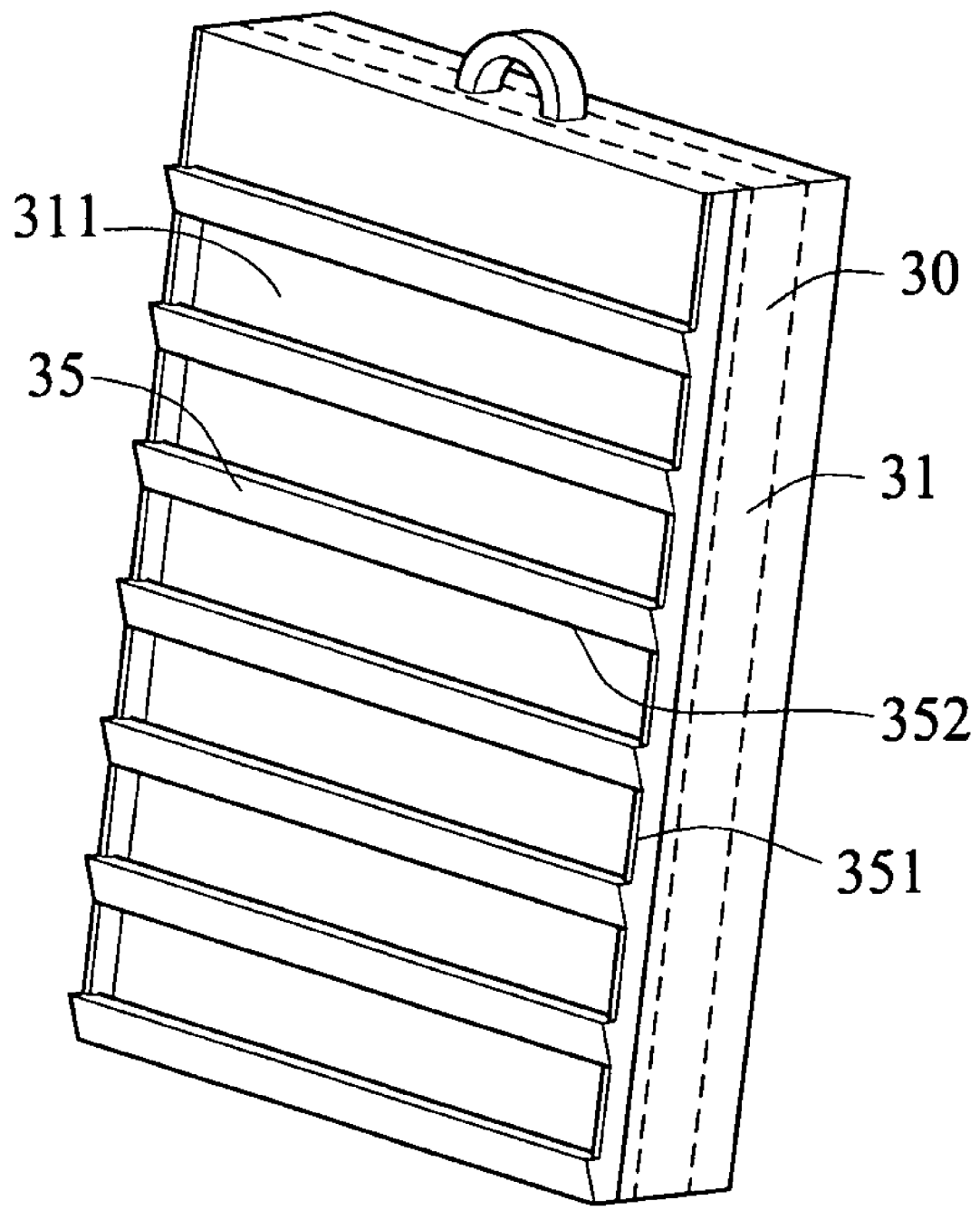
FIG. 4 is the three-dimensional view of second embodiment of the invention.

The box filter 30 illustrated in FIGS. 4 to 6 comprises of two filters 32, 33, an influx channel 311 and an afflux channel 312. The filters 32, 33 are installed inside the casing 31 behind the influx channel 311. The influx channel 311 and the afflux channel 312 on the front and rear walls of the casing 21 to conduct the sewage and drain the filtrated water. Specifically, the influx channel 311 is located on front wall of casing 31 of the box filter 30 to receive the sewage from the container; the afflux channels 312, which are arrayed in matrix, are located on rear wall of casing 21 of the box filter 30 to drain the filtrated water. The filters 32, 33 are spaced in parallel at intervals and are made of laminated materials such as filter floss and so on. The buffer gap 34 is formed between the two filters 32, 33, in order to balance the water pressure when the sewage (e.g water in the aquarium) passes the first filter 32 of the box filter to enter into the buffer gap 34, and then enters into the second filter 33 to be filtrated, and the afflux channel 312 is sealed to accommodate several filters 32. Several guide vanes 35, which are spaced in parallel at intervals, are installed at inlet of the influx channel 311 of the box filter 30 and are locked by connecting two ends to two parallel connecting bars 351, which are installed on the casing 31.

With reference to FIGS. 5, 6, 8, and 9, the bottom 352 of each guide vane 35 tilts to lean against the filter 32. The optimal way that the guide vanes 35 tilt inwardly and the bottom 352 of each guide vane 35 leans against the filter 32. In the process of filtration, the sewage flows against the guide vanes 35 and the guide vanes 35 provide obstruction to guide the sewage into the box filter 30. To enhance the filtration effect, the filter, which is installed on top of the water flow to be filtrated, becomes finer and more condensed by approaching the influx channel 311.

The foregoing filters 32', 33' illustrated in FIG. 7 may be of a corrugated or wave type to be adaptive to filtration of different types of sewage. To enhance the filtration effect, grainy substances 36 for filtration may be installed between the two adjacent filters 32', 33'. The filtration effect can be further enhanced by installing grainy substances 37 between the filter 33' beside the afflux channel 312 (which refers to the filter behind the afflux channel) and the casing 31. To stop the grainy substance 37 from leaking, the afflux channel 312 is sealed by filter floss 38, which can stop leakage of the grainy substance 37 without hindering the water flow. The foregoing grainy substances 36, 37 may be absorbing or ion exchange filters.

Figure 10:
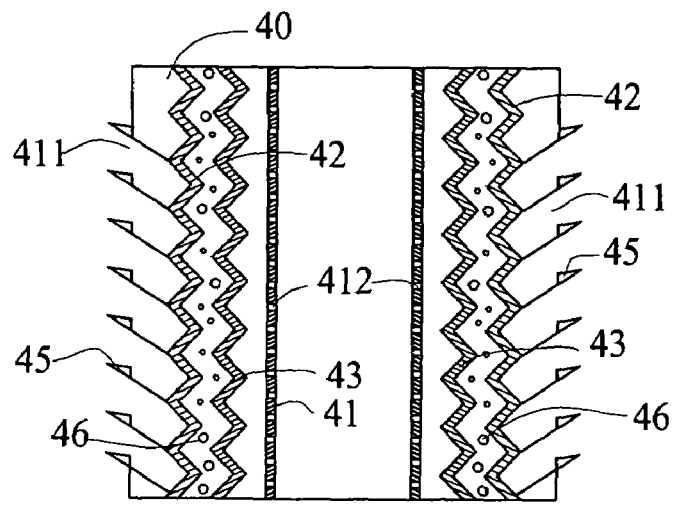
FIG. 10 is the perspective view of box filter of the second embodiment of the invention.

The box filter 40 illustrated in FIG. 10 comprises of a casing 41, which is a hollow cubic and can be polygonal according to actual needs, the influx channel 411, which is installed inside the casing, and the afflux cannel 412, which is installed outside the casing. Furthermore, the influx channel 411 comprises of the guide vanes 45 that are similar to the guide vanes 35 illustrated in FIGS. 4 to 6 in terms of shape and structure. Therefore, no further descriptions of the guide vane 45 are made hereby. In the box filter 40, the space between the influx channel 411 and the afflux channel 412 is sealed to accommodate the corrugated filters 42, 43, which are spaced in parallel at intervals. The filtrated water is drained from the afflux channel 412. To enhance the filtration effect, the filters 42, 43 become finer and more condense by approaching the outlet of the afflux channel 412. The filtration effect can be further enhanced by installing the grainy substance 46 for filtration between the two adjacent filters 42, 43 as well as between the filter 43 beside the afflux channel 412 (which means the filter behind the afflux channel 412) and the casing 41.

Figure 11:
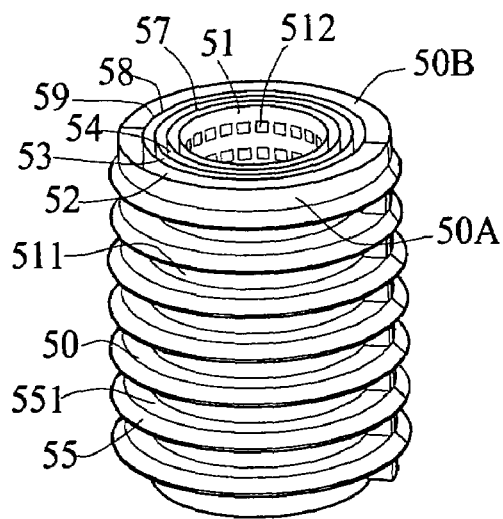
FIG. 11 is the three-dimensional inverse view of box filter of the third embodiment of the invention.
Figure 12:
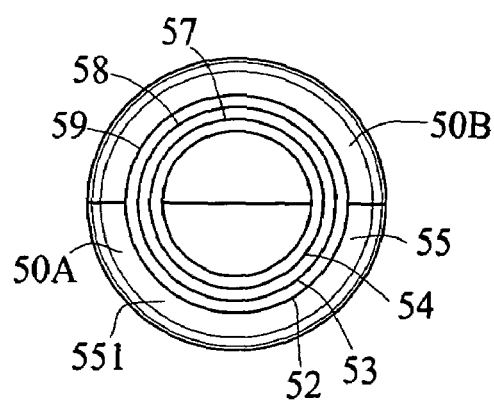
FIG. 12 is the bird's-eye view of the fox filter of FIG. 11.

The box filter 50 illustrated in FIGS. 11 and 12 comprises of two hemisphere filtration units—the first filtration unit 50A and the second filtration unit 50B form a column, which has guide vanes 55 on the exterior surface. The bottom 551 of each guide vane 55 tilts to lean against the filter 52. The sewage flows against the guide vanes 55 into the first filtration unit 50A, where three filters 52, 53, 54 are spaced in parallel at intervals, and then the second filtration unit 50B, where three filters 57, 58, 59 are spaced in parallel at intervals. The filters 52, 53, 54 and 57, 58, 59 can be assembled respectively into two integrals. After filtration by filters 52, 53, 54 or filters 57, 58, 59, the filtrated water enters into the hollow of the box filter 50 to be drained by the afflux channels 512 on the internal wall of the casing 51. Moreover, the grainy substances, which may be absorbing or ion exchange filters (FIG. 7), can be installed between filters 52, 53, 54 and 57, 58, 59 so as to further enhance the filtration effect.

New characteristics and advantages of the present invention covered by this document have been set forth in the foregoing description. It is to be expressly understood, however, that the drawings are for the purpose of illustration only and are not intended as a definition of the limits of the invention. Those who are skilled in the art may make changes in the details of the methods, shapes, structures, or devices without exceeding the scope of the invention. The scope of the invention is, of course, defined in the language in which the appended claims are expressed.

To sum up, the box filter of the present invention successfully stops backflow of the dirt into the aquarium or container of the sift device when the box filter or sift device is removed from the aquarium so as to possess the "practicability" and the "advancement" of the industry field. Furthermore, the present invention conforms therefore to the requirements of a new utility model and is submitted for patent registration according to the Patent Act in view the structure of the present invention has never been disclosed in any publication or for any application.

What is claimed is:

1. A box filter, comprising:
    a casing having an influx channel, the influx channel having an inlet;
    a plurality of filters installed inside the casing behind the influx channel; and
    a plurality of guide vanes installed at the inlet of the influx channel, the plurality of guide vanes extending horizontally and being vertically spaced from one another over substantially an entire influx side of one of the plurality of filters closest to the influx channel, and each guide vane tilting inwardly such that a top of each guide vane is spaced apart from the one of the plurality of filters closest to the influx channel and a bottom of each guide vane leans against the one of the plurality of filters closest to the influx channel.

2. The box filter of claim 1, wherein the plurality of filters includes at least two filters that are adjacent to each other, thereby forming a buffer gap between the two filters.

3. The box filter of claim 1, wherein at least one of said plurality of filters is of a corrugated or wave type.

4. The box filter of claim 1, wherein a grainy substance for filtration is installed in a gap formed by two adjacent ones of the plurality of filters.

5. The box filter of claim 4, wherein said grainy substance is an absorbing or ion exchange filter.

6. The box filter of claim 1, wherein
    the casing has an afflux channel sealed by a filter floss; and
    a grainy substance for filtration is installed in a gap formed between one of the filters closest to the afflux channel and the filter floss.

7. A box filter, comprising:

a casing having an influx channel and an afflux channel, the influx channel having an inlet, the afflux channel being sealed by a filter floss;

a plurality of filters installed inside the casing between the influx channel and the afflux channel; and a plurality of guide vanes installed at the inlet of the influx channel, the plurality of guide vanes extending horizontally and being vertically spaced from one another over substantially an entire influx side of one of the plurality of filters closest to the influx channel, wherein the plurality of guide vanes tilt inwardly such that a top of each guide vane is spaced apart from the one of the plurality of filters closest to the influx channel and a bottom of each guide vane leans against the one of the plurality of filters closest to the influx channel;

the plurality of filters includes at least one that is of a corrugated or wave type, and includes two filters that are adjacent to each other, a buffer gap being formed therebetween; and a grainy substance for filtration is installed in the buffer gap, and in a gap formed between the filter floss and one of the filters closest to the afflux channel, the grainy substance being an absorbing or ion exchange filter.

* * * * *